United States Patent

US011676500B1

(12) United States Patent
Tolland et al.

(10) Patent No.: US 11,676,500 B1
(45) Date of Patent: *Jun. 13, 2023

(54) SYSTEMS AND METHODS TO MEASURE PERFORMANCE

(71) Applicant: Aptima, Inc., Woburn, MA (US)

(72) Inventors: Michael Tolland, Woburn, MA (US); Zachary Zuzack, Waltham, MA (US)

(73) Assignee: Aptima, Inc., Woburn, MA (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/229,907

(22) Filed: Apr. 14, 2021

Related U.S. Application Data

(63) Continuation of application No. 16/574,687, filed on Sep. 18, 2019, now Pat. No. 10,997,868, which is a
(Continued)

(51) Int. Cl.
*G09B 7/00* (2006.01)
*G09B 5/00* (2006.01)
(Continued)

(52) U.S. Cl.
CPC ........... *G09B 5/00* (2013.01); *G06F 3/04842* (2013.01); *G06F 3/04847* (2013.01)

(58) Field of Classification Search
CPC .. G09B 9/00; G09B 9/02; G06F 17/30; G06F 17/30516; G06F 17/30528; H04N 21/23109
(Continued)

(56) References Cited

U.S. PATENT DOCUMENTS 4,977,529 A    12/1990   Gregg et al.
6,029,156 A *   2/2000   Lannert ................ G09B 7/04
                                                     706/11

(Continued)

OTHER PUBLICATIONS

Cuff, Michael A., Restriction Requirement for parent U.S. Appl. No. 15/098,216, filed Apr. 13, 2016, dated May 29, 2018, 6 pages. USPTO.

(Continued)

*Primary Examiner* — Michael A Cuff
(74) *Attorney, Agent, or Firm* — John J. Brooks, III

(57) ABSTRACT

Methods of and systems to provide performance measurement are provided utilizing an architecture configured to efficiently merge and monitor different types of performance data. Connectors are provided to receive and translate different types of performance data from different sources. The performance data is translated into and stored in a common data model format. In some embodiments, key attributes are defined for each of the performance data sources that uniquely characterizes each relevant performance data so that is can be parsed into separate processing streams to increase system performance. The key attributes also act as cues to organize the performance data as it is being merged so that it can be accessed without requiring a specific source data linkage. Using model listeners, determinations can be quickly made regarding when performance data is changed to reduce calculations necessary to determine measure values. Some embodiments merge different types of performance data in real-time.

14 Claims, 12 Drawing Sheets

Related U.S. Application Data continuation of application No. 15/098,216, filed on Apr. 13, 2016, now Pat. No. 10,431,106.

(60) Provisional application No. 62/146,446, filed on Apr. 13, 2015.

(51) Int. Cl.
  *G06F 3/04842* (2022.01)
  *G06F 3/04847* (2022.01)

(58) Field of Classification Search
  USPC .......................................................... 434/362
  See application file for complete search history.

(56) References Cited

U.S. PATENT DOCUMENTS

| | | | |
|---|---|---|---|
| 6,944,596 | B1 | 9/2005 | Gray et al. |
| 7,386,524 | B2 * | 6/2008 | Hubbell ................. G09B 19/18 706/11 |
| 9,092,502 | B1 | 7/2015 | Cannaliato et al. |
| 10,431,106 | B1 | 10/2019 | Tolland et al. |
| 10,997,868 | B1 | 5/2021 | Tolland et al. |
| 2003/0105811 | A1 | 6/2003 | Laborde et al. |
| 2007/0219976 | A1 | 9/2007 | Muralidhar et al. |
| 2009/0157627 | A1 | 6/2009 | Arthursson |
| 2010/0057848 | A1 * | 3/2010 | Mangold ................ G16H 20/30 709/203 |
| 2012/0030368 | A1 | 2/2012 | John et al. |
| 2013/0066448 | A1 * | 3/2013 | Alonso ................... H04Q 9/00 700/91 |
| 2013/0189656 | A1 | 7/2013 | Zboray et al. |
| 2013/0280658 | A1 | 10/2013 | Patrickson et al. |
| 2014/0075028 | A1 | 3/2014 | Weiner et al. |
| 2014/0156806 | A1 | 6/2014 | Karpistsenko et al. |
| 2014/0243749 | A1 | 8/2014 | Edwards et al. |
| 2014/0289834 | A1 | 9/2014 | Lindemann |
| 2015/0073750 | A1 | 3/2015 | Steuble et al. |
| 2015/0095333 | A1 | 4/2015 | Porpora et al. |
| 2015/0121246 | A1 | 4/2015 | Poore et al. |
| 2015/0149837 | A1 * | 5/2015 | Alonso ................ H04W 4/029 714/57 |

OTHER PUBLICATIONS

Cuff, Michael A., Office Action detail for parent U.S. Appl. No. 15/098,216, filed Apr. 13, 2016, dated Nov. 27, 2018, 14 pages. USPTO.

Cuff, Michael A., Notice of Allowance for parent U.S. Appl. No. 15/098,216, filed Apr. 13, 2016, dated May 13, 2019, 5 pages. USPTO.

Cuff, Michael A., Office Action details for parent U.S. Appl. No. 16/574,687, filed Sep. 18, 2019, dated Sep. 25, 2020, 20 pages. USPTO.

Cuff, Michael A., Notice of Allowance for parent U.S. Appl. No. 16/574,687, filed Sep. 18, 2019, dated Jan. 4, 2021, 8 pages. USPTO.

Construct User Guide, as downloaded from the Internet on Jan. 7, 2016 from site "http://www.support.asti-usa.com"., 11 pages.

Stacy, Webb; Ayers, Jeanine; Freeman, Jared; Haimson, Craig, "Representing Human Performance with Human Performance Measurement Language", Proceedings of the Interservice/Industry Training, Simulation and Education Conference (2006), Arlington, VA, 11 pages.

Aptima, Inc., Advertising for PM Engine, as distributed at the Orlando/ITSEC Conference, Dec. 2, 2013, Aptima, Inc., Orlando, FL, 1 page.

Aptima, Inc., Advertising for PM Engine, as distributed at the Orlando/ITSEC Conference, Dec. 1, 2014, Aptima, Inc., Orlando, FL, 1 page.

Aptima, Inc., Advertising for PM Engine, as distributed at the Orlando/ITSEC Conference, Nov. 30, 2015, Aptima, Inc., Orlando, FL, 1 page.

Aptima, Inc., Redacted portions of Technical Proposal P-9998-933, titled "PMATT-TA", as submitted to the United States Office of Naval Research, USA, on Apr. 5, 2012, not published, 7 pages.

* cited by examiner

SYSTEMS AND METHODS TO MEASURE PERFORMANCE

CROSS-REFERENCE TO RELATED APPLICATIONS

This application is a continuation application of pending U.S. patent application Ser. No. 16/574,687 filed Sep. 18, 2019 entitled "SYSTEMS AND METHODS TO MEASURE PERFORMANCE"; U.S. patent application Ser. No. 16/574,687 claims benefit of U.S. application Ser. No. 15/098,216 filed Apr. 13, 2016, now U.S. Pat. No. 10,431,106 issued on 1 Oct. 2019 entitled "SYSTEMS AND METHODS TO MEASURE PERFORMANCE"; U.S. patent application Ser. No. 15/098,216 claims benefit of U.S. App. No. 62/146,446 filed Apr. 13, 2015 entitled "SYSTEMS AND METHODS TO MEASURE PERFORMANCE"; and the contents of all these applications are herein incorporated by reference in their entirety.

STATEMENT REGARDING FEDERALLY SPONSORED RESEARCH OR DEVELOPMENT

Some of this invention was made with Government support under Contract #N68335-12-C-0296 with the U.S. Navy. The Government has certain rights in the invention.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

Embodiments are generally related to training and simulation systems and methods of measuring the performance of one or more users as they use the systems. Embodiments also relate to measuring and accessing the performance of individuals and teams in real-time using one or more data sources from the training and simulation environment.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

In one example embodiment, a computer based performance measurement system to measure a performance of a user is provided comprising a user environment and a performance measurement subsystem. The user environment is configured to communicate performance data of a user to the performance measurement subsystem. The performance measurement subsystem comprises a connector, a payload processor, a processor, a common data model store and a model listener. The connector is configured to transform each the performance data into a component according to a format of a common data model and communicate the component with a unique key. The payload processor is configured to receive the component and distribute the component to one of at least one processor according to the unique key. The common data model store is configured to containing an existing component stored according to format of the common data model. The processor is configured to merge the component with the existing component in the common data model store. The model listener is configured to identify a change to components in the common data store whereby the change can be communicated to a measure. In some embodiments, the performance measurement system further comprises the measure calculating a measure value and the processor configured to merge the measure value with the existing component in the common data model store.

In one example embodiment, a computer based performance measurement system to measure a performance of a user is provided comprising a user environment and a performance measurement subsystem. The user environment is configured to communicate performance data of a user to the performance measurement subsystem wherein the performance measurement subsystem comprises multiple connectors, a payload processor, multiple processors, a common data model store and multiple model listeners. After the connectors translate the performance data to multiple components with unique keys, the payload processor is configured to distribute the components, to separate processors according to the unique key of the components. The processors are configured to merge the components with existing components in the common data model store.

In one example embodiment, a computer based performance measurement system to measure a performance of a user in a multi-modal simulator configured to detect a user input received at a physiological interface and a joystick and transform the user input to a first and a second performance data. The user environment is configured to communicate the first and the second performance data to a performance measurement subsystem comprising a first and second connector, a payload processor, a first and second processor, at least one common data model store and a first and second model listener. The first connector configured to identify a first unique key from the first performance data, transform the first performance data into a first component property of a first component according to a format of a common data model and communicate the first component with the first unique key. The second connector configured to identify a second unique key from the second performance data, transform the second performance data into a second component property of a second component according to the format of the common data model and communicate the second component with the first unique key. The payload processor configured to receive the first component and the first unique key and distribute the first component to the first processor according to the first unique key. The payload processor is also configured to receive the second component and the second unique key and distribute the second component to the second processor according to the second unique key. The first and second processor are configured to merge the first and second components with existing components in the common data store. The first and second model listeners are configured to identify changes in the existing components and communicate the changes to a measure. In some embodiments, the first component comprising a simulation event at a synchronized time, the second component comprising a physiological state at the synchronized time, one of the existing components comprises an existing physiological state of a user and the calculates a physiological measure of the user given the simulation event at the synchronized time.

In one example embodiment, a computer based method of providing performance measurement data is provided comprising receiving a plurality of performance data inputs from at least one user interface of a training simulator wherein the plurality of performance data inputs represent a plurality of types of performance data and wherein each of the plurality of types of performance data have a unique attribute, translating the plurality of types performance data into a plurality of components according to a common data model format wherein the plurality of components comprise a plurality of component properties defining a plurality of states and a plurality of events, separating the plurality of components for processing by a plurality of payload processors, merging the plurality of components with a synchronized time value into a common data model store according to the common data model format, monitoring the merging of the components in the common data model store, identifying a change to the component or the component property, communicating the change to a measure to calculate a measure value, and communicating the measure value as a performance measurement.

In some embodiments, the user environment comprises a computer game console and the user interface comprises a computer game controller. In some embodiments, the user environment comprises a multi-modal training simulator. In some embodiments, the user interface comprises a physiological interface such as one or more electrocardiogram (ECG) or electroencephalogram (EEG) electrodes for recording electrical impulses as the performance data. In some embodiments, the training simulator is a vehicle training simulator. In some embodiments, the measure value is be used as an updated component property to calculate another measure value.

In some embodiments, the user environment comprises a multi-modal training simulator and the at least one user interface comprises a physiological interface. The at least one component comprises a first component comprising a simulation event of a synthetic entity and a second component comprising a physiological state and the first component and the second component having a synchronized time value. When the physiological state is merged with an existing physiological state in the common data model store, the at least one model listener recognizes a change to the existing physiological state and communicates the change to the measure and the measure determine a measure value comprises a physiological measure of the user given the simulation event at the synchronized time value. In some embodiments, the measure value of the user given the simulation event is stored in the common data store whereby the measure value can be used as a component property to calculate another measure value.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

System components and related methods to assist performance measurement will now be described in detail with reference to the accompanying drawings. It will be appreciated that while the following description focuses on a training system, the systems and methods disclosed herein have wide applicability. Notwithstanding the specific example embodiments set forth below, all such variations and modifications that would be envisioned by one of ordinary skill in the art are intended to fall within the scope of this disclosure.

Figure 1A:
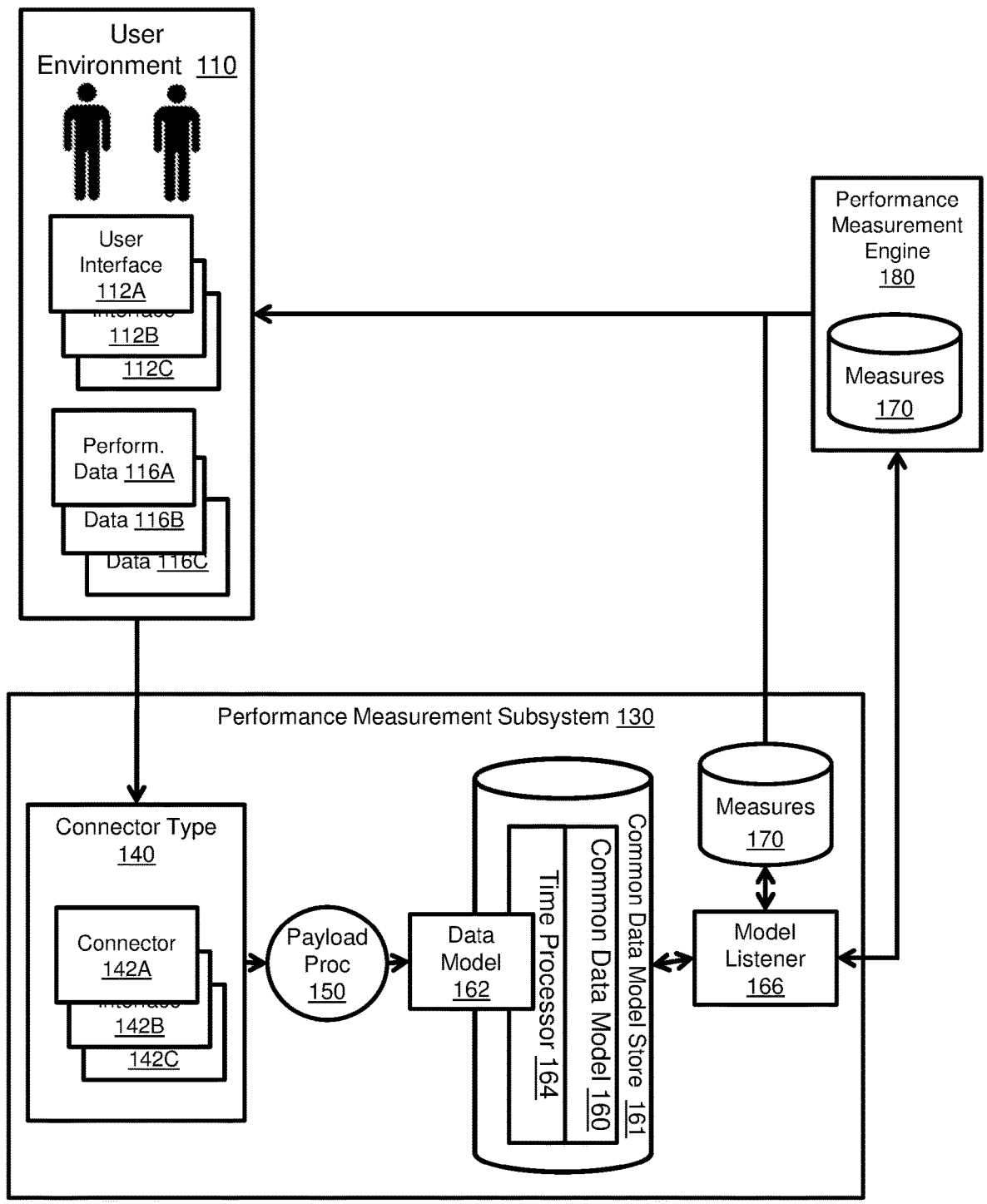
FIG. 1A shows a system diagram illustrating the high level architecture of one example embodiment of a system to measure performance.

Throughout the discussion and accompanying figures, examples of multiple instances of components are shown. For example, three user interfaces 112A-112C are shown in FIG. 1A. It is understood that these numbers of instances are for illustration only and not for limitation. The number of instances may be more or less than the examples described and illustrated.

In the field of performance measuring systems, in particular training systems and methods, measuring and assessing the performance of individuals and teams in real-time, using multiple data sources, is difficult. Typically, the multiple data sources have different data structures and are read at variable frequencies within source and different frequencies across sources, making it difficult to combine and compute measures from these heterogeneous data. Given that different data sources provide insight into different facets of individual and team performance, the inability to effectively combine these data greatly inhibits the accurate characterization of real-time human performance. Further, given that assessments of human performance requires multi-source measurements, measures from one source must be capable of cueing/informing the collection of subsequent measurements within that same source, as well as across other sources, and doing so in real-time.

Traditional attempts to address this shortcoming have focused on only a) the real-time measurement challenge, or b) the multi-modal measurement challenge, in isolation. Current solutions address the challenge of real-time measurement by focusing on a single data source (e.g., simulator data) and mostly discount other sources (e.g., neurological, physiological, observation, and communication data). While these solutions may incorporate additional (multi-modal) sources of data, they only do so in a post-hoc manner which requires manual evaluation and integration of those data. The exclusion of these additional sources of data, real-time, greatly inhibits a comprehensive understanding of individual and team performance and limits the ability of instructors/trainers to provide timely feedback.

The disclosed solution addresses shortcomings found in existing solutions by providing a plugin architecture and a common data model format that allows the processing and merging of different types of data. Some embodiments are able to merge, or fuse, the data in real-time, in near real-time or in a synchronized time. This solution also recognizes that an effective solution incorporates multiple sources data and achieves multi-modal real-time assessment by using measures from one source to cue/trigger additional measures within that same source, and across sources. Using a variety of connectors for different types of data sources, the data are merged into a common data model format that can be queried and otherwise manipulated. Relying on a common data model format and state and event data, the individual connectors translate the incoming performance data. State data are a type of performance data which have temporal extent, though they can change over time. Event data are a type of performance data that occur at a single moment and may include data from a user interface or data provided from components of the performance measurement system. In addition to merging, combining or otherwise translating this performance data into a common data model format, the solution also utilizes unique attributes in each of the performance data sources that uniquely characterize each relevant performance data so they can be parsed into separate processing streams to increase performance. These unique attributes are used as identifiers, or are used to assign unique identifiers (also called or unique keys) to act as cues to organize the data as it is being merged, or fused, so that it can be accessed without requiring a specific source data linkage. Using state information on how the data is changing over time, the systems are also able to determine when the data has been altered and can scale the amount of measurement needed, focusing only on fast changing data. In essence, the systems measure data when it changes and reuse past state data when the data is unchanged. This allows the system to track more information at faster speeds while still providing accurate performance data in real-time.

The connector-based, plugin architecture allows individual data parsers to break down the raw performance data. The process of breaking down the raw performance data from the multiple different data sources is implemented in multiple steps. First a unique key for each data packet of raw performance data is used to group unique performance data even as it is being parsed. The unique key is a string that is related to a component (state or event) that the common data model understands as a unique identifier. When two data structures have the same unique key they can be merged in order to update the component in the common data model. On top of the connectors the next part of the implemented solution is the payload processors, processors and data models. These components handle the merging, updating, and notification system of the solution. These actions are important for the real-time application of this solution because they enable efficient processing of the multi modal performance data. For instance, the ability to notify measures about changes in the common data model across all the different performance data allows a trigger of measures in real-time. Some embodiments of the solution use parallel processing with multiple threads in the application. An event model is also used that allows measures to monitor specific states and events and recognize a multitude of different things like new data, and changes in the common data model store. Embodiment merge the multi-modal performance data in parallel without having to understand what the data is. It is able to do this by using the unique key to understand which data goes together and which data is separate. As the data is merging the solution also checks for changes and uses the event model to notify the measurements.

The disclosed solution combines multiple data from different sources, and presents a unique method for speeding the processing of these data to create a real-time multi-modal assessment capability. Combining observational data about how an instructor rates the student performance they observe is very different from physiological data like heart rate data or electrocardiogram (ECG) impulses as data, and it is far from clear how they might be automatically combined. Similarly, combining data from a user environment, such as simulator data, which shows the exact position and speed of aircraft, cars, and boats with a text from a phone or an email from a computer would not be easily conceived (or solved). Nevertheless all these things can be used to measure the performance of an individual or team and to make associated assessments based on the context in which performance was measured. Combining all of this data into a single common data model allows an instructor or scientist to query the data and join them in a single measurement while being able to do so quickly in the event real-time performance measuring is needed. The disclosed solution maps multiple types of data to a common data model of states and events and also adds a unique identifier, or unique key, to each piece of data to link them together so that they can be interpreted to understand and augment performance (e.g., adjusting the training content to address performance decrements and improve performance). Combined with the model listeners that are configured to monitor for changes in data over time, and focuses processing time on changing data, the systems can achieve real-time multi-modal measurement across data sources. Further, being able to accomplish real-time or near-real time measurement allows us to accomplish triggering of measures across the different multi-modal data to provide a more comprehensive characterization of individual and team performance.

This approach of using unique keys and model listeners together with a flexible and dynamic high level common data model format provides a performance measurement system that is faster than existing models and allows multi-modal data sources to be combined quickly and used by instructors and scientists in performance measurement.

In some embodiments, efficiency and timeliness is very important to appropriately determine measures and performance measurements during the collection of performance data. The importance of quickly determining measures is also important when measures require data from multiple performance data types. In some embodiments, the performance measurement system is capable of receiving 25000 hz data messages as performance data and perform 5000+ independent calculations per second.

In one embodiment of the invention, the systems and methods to achieve data fusion and performance measurement across multiple types of data sources comprise the following steps performed not necessarily in this order:

Define a plugin common data model architecture that can support multiple types of data.

Identify the unique attributes in each data type that uniquely define each type of data.

Translate each type of data into a common data model format of states and events that can be recognized using the unique attributes from before as a unique key or to assign a unique key.

Separate and unify the processing of the multiple types of data into the common data model format to maximize efficiency of updating the common data model store.

Monitor the common data model store as the multiple types of data flow into the common data model to determine down to specific parameters when data has changed to limit the computation necessary to perform the performance measurement and trigger measurement on specific data.

These steps provide the basis for example embodiments of the disclosed solution to provide performance measurement across multiple data sources.

Some embodiments of the disclosed systems and methods to measure performance are used with training and simulation systems such as vehicle simulators. These simulators may be any type of stand-alone simulator or distributed simulation system. The disclosed systems and methods may merge data sources such as one or more type of simulator data with other types of data such as, but not limited to neurological, physiological, observation, and communication data of the trainee or other parties in the simulation. The disclosed systems and methods may merge and analyze this multi-modal data and communicate the results of the analysis, for example as measurements, to a user through such means such as a graphic user interface or simply as data to be utilized by other systems.

One Example Embodiment of a Performance Measurement System:

For illustration purposes and not for limitation, one example embodiment of a performance measurement system architecture is show in FIG. 1A. As shown in FIG. 1A, the example architecture comprises a user environment 110 configured to pass performance data 116A-116C to a performance measurement subsystem 130 which determines or outputs performance measures 170 that may be used by the common data model 160 or shared with the user and/or the user environment 110. As performance data 116A-116C is received by connectors 140, the performance data is parsed into a common data model format 160 for use by other system components.

The user environment 110 is typically an environment configured to enable users to interact with one or more user interface 112A-112C and pass resulting performance data 116A-116C to the performance measurement subsystem 130. The user environment 110 may comprise a simulation environment with various interfaces providing input from a user. The user environment 110 may also incorporate live data and may also incorporate data from remote data sources over a data or other type of communications network. From the user's performance within the user environment 110, the user interfaces 112A-112C track and provide performance data 116A-116C for use by the performance measurement subsystem 130. The user interfaces 112A-112C may comprise any type of interface suitable to accepting an input from a user and communicating that input as performance data 116A-116C. For example, a user interface to a computer based simulator may comprise a computer game controller such as a joystick, a steering wheel, a wireless controller, a mouse, gaming glasses, a microphone or a tablet computer. User interfaces 112A-112C may also comprise custom made interfaces to accurately reflect an environment being simulated such as the cockpit of an aircraft or an air traffic control station. User interfaces 112A-112C may also comprise interfaces to receive neurological, physiological, observation, and communication data of the user or of any other entity in the user environment 110 or the simulation. User interfaces 112A-112C may also comprise interfaces to receive data related to the user environment 110 such as data related to movement, positioning, weather, geography, events, simulated data or any other environmental data from the user environment 110.

Figure 1B:
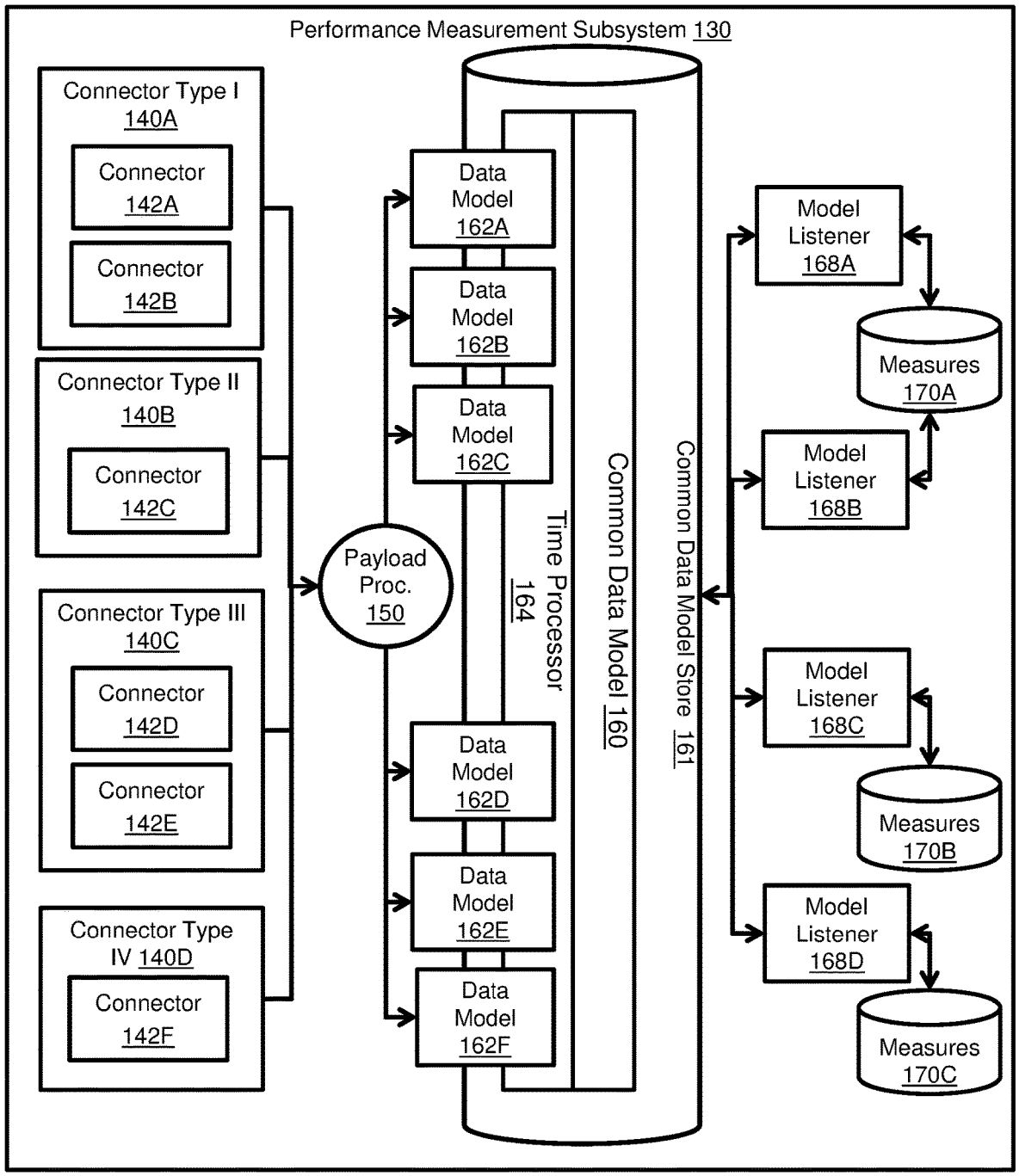
FIG. 1B shows a system diagram illustrating the high level architecture of one example embodiment of the performance measurement subsystem.

Referring to a more detailed view of an example performance measurement subsystem in FIG. 1B, the performance measurement subsystem 130 receives the performance data though connector types 140A-140D which then parse the performance data into components and component properties. These components and component properties are passed to a payload processor 150. The payload processor 150 distributes and merges the components and component properties to data models 162A-162F which pass these components and component properties to a common data model store 161 according to a pre-defined format of a common data model 160. The data models 162A-162F synchronize entry of components and component properties into the common data model store 161 through the use of a time processor 164 which provides a relative time or clock to which all of the data uses to synchronize components and component properties to a time component in the common data store 161. The common data store 161 is monitored by model listeners 168A-168D which are programmed to recognize changes made to component properties or components and when a change is identified, the model listeners 168A-168D may communicate these changes to measures 170A-170C. The measures 170A-170C provide a further calculation or determination of data reflecting data related to the user environment. In some embodiments, some measures are formatted in an emerging SISO standard called Human Performance Measurement Language (HPML) format as defined in "Representing Human Performance with Human Performance Measurement Language" by Webb Stacy, Ph.D., Jeanine Ayers, Jared Freeman, Ph.D., Craig Haimson, Ph.D. which is herein incorporated by reference in its entirety.

Referring to FIG. 1B, a connector 142A-142F is a functional element that acts as a plugin from the user environment (not shown) to the performance measurement subsystem 130. The connector 142A-142F generally acts as an application program interface (API) that allows communication from the user environment and the user interface to be received by the performance measurement subsystem 130. Connector types (140A-140D) are a general grouping of connectors 142A-142F and are a way to recognize the types of performance data they receive. The connectors 142A-142F may be implemented in software using programs such as websockets. As examples for illustrations only, connector types 140A-140D may comprise High-Level Architecture (HLA) connector for receiving performance data from computer simulation systems in the HLA format, Distributed Interactive Simulation (DIS) connector for receiving performance data from real-time wargaming simulations and training, eyetracking connectors for receiving eye tracking data, physiological data connector for receiving physiological data (e.g. ECG data) from the user, biological data connector for receiving biological data from the user or audio connectors to recognize audio or spoken data from the user. The connectors 142A-142F may also be configured to received performance data from other entities in the user environment. These other entities may include other participants or simulated entities in a simulation or a live activity.

Figure 2A:
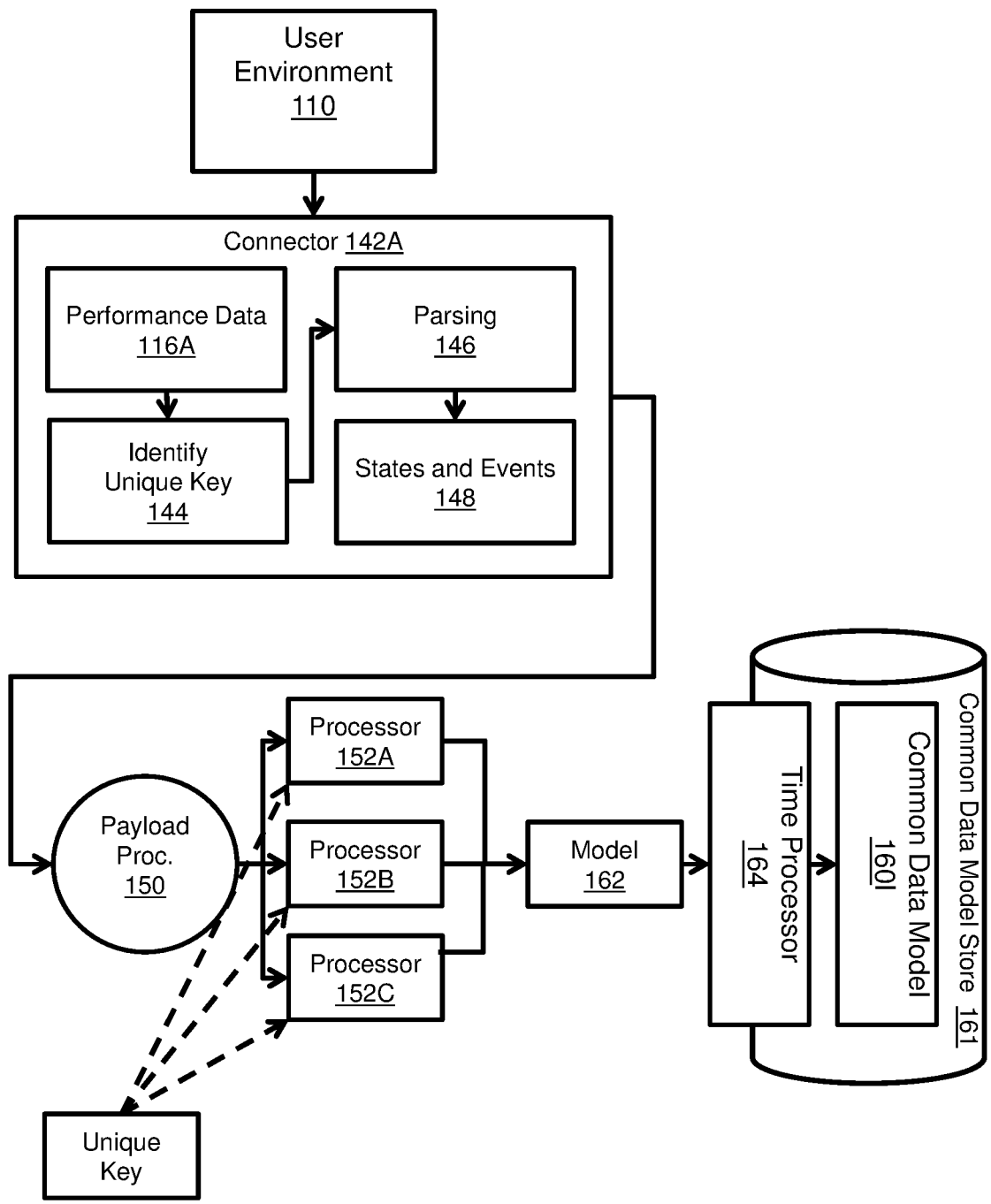
FIG. 2A shows a system diagram illustrating example details of components of the performance measurement subsystem of FIG. 1B.

Referring to the functional diagram of FIG. 2A, the connector 142A performs the process of taking raw performance data 116A from a single data source in the user environment 110, identifying the unique key 144 for the performance data based on the unique attributes, parsing the performance data 116A into components and component data consistent with the common data model at 146 and recognizing the components and component properties as a state or an event at 148. In some embodiments, multiple connectors may be used at once and duplicates of the same connector can be used. Each connector 142A will typically use the unique key so the performance data 116A coming from that connector 142A can be tagged to identify the source of that performance data 116A. The unique key is a string of data based on the unique attributes of the performance data 116A. The unique key is also related to a component (state or event) that the common data model understands as a unique identifier for that component. The unique attributes in the performance data may be manually identified or they may be automatically determined. The unique key may be manually identified for each connector and assigned to components or each connector may be programmed to recognize unique attributes and create and assign a unique key. This tagging with a unique key helps define which components and component properties (packets of parsed performance data) are different and which are related so that they can be tracked and merged if necessary. For example, understanding that a single human is the same or different is important during the merging of components and component data into the common data model store 161. If one source of performance data is specifically related to a human user, if the human is the same throughout the performance measurement, it is helpful to make sure the performance data is merged with other performance data from that human so that duplicate human objects were not created. If the performance data is related to a different user, you would want to make sure they are recognized as separate human objects and do not merge into the same common data model.

Referring to FIG. 2A, the payload processor 150 acts as a load management system taking in components and component data (parsed performance data) from all the different connectors, here connector 142A, sorting and passing the data along to the correct processor (152A-152C) and the correct data model 162. The payload processor 150 keeps track of queue maximum size and current queue size of the processors 152A-152C. The component and component properties (parsed performance data) from the connectors is put into a thread safe queue and then de-queued in a synchronized fashion. The de-queued data is then passed to the appropriate processor 152A-152C, according to the unique key, which adds the component and component properties to the data model 162. The processor 152A-152C handles adding components to the common data model store 161 and attaching model listeners to the new components. Each processor 152A-152C is tied to one unique key for states. The processor 152A-152C will merge new states into past/existing states in the common data store 161 in order to update the components and component properties. Prior to being stored in the common data model store 161, components and component properties are checked to ensure they are added with a proper time value from a time processor 164. This adding of the time value from the time processor 164 functions to synchronize all of the components and component properties added to the common data model store 161 with a synchronized time value.

Figure 10:
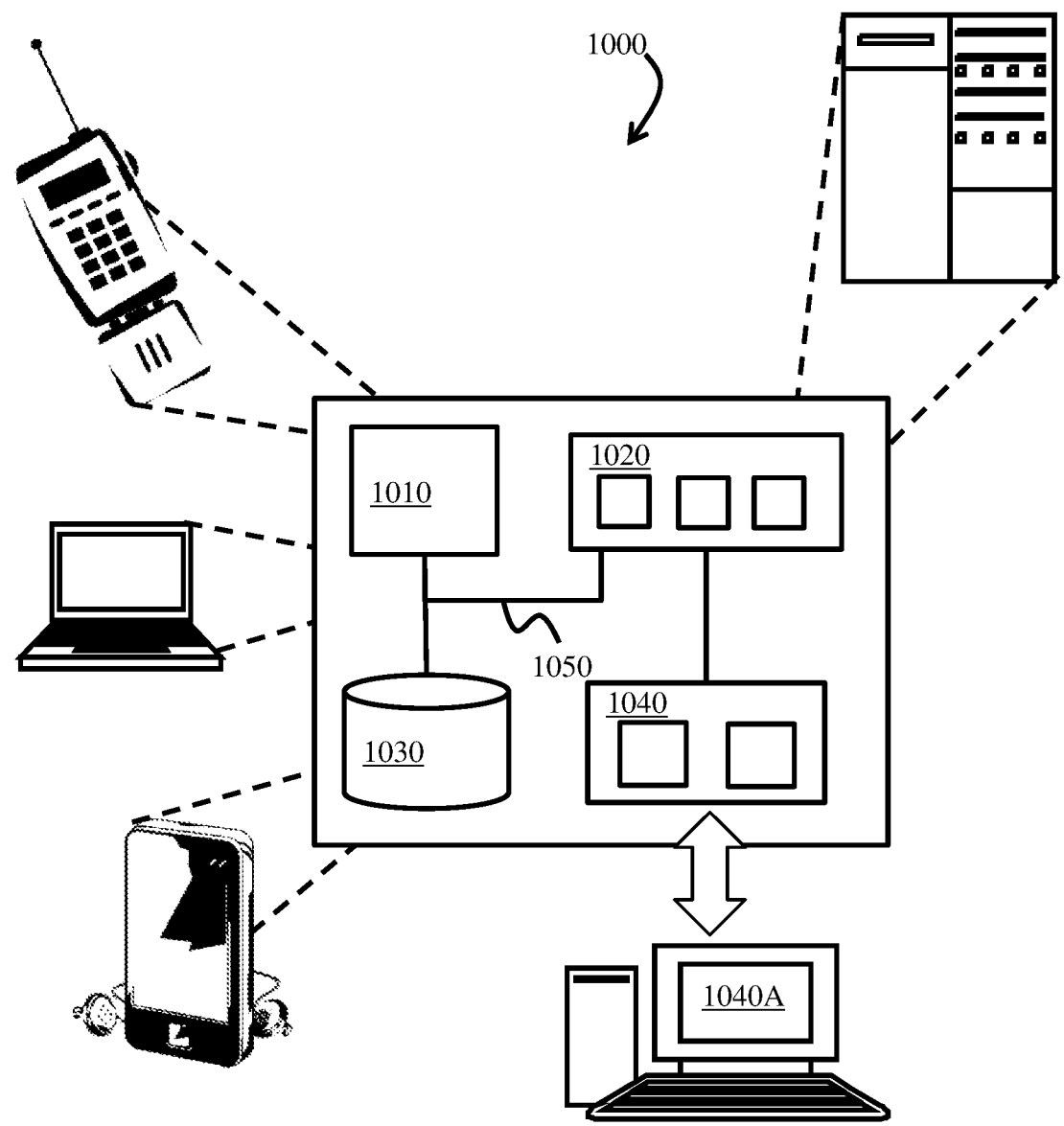
FIG. 10 shows one example embodiment of a computer system suitable for performance measurement systems.

As used herein, the payload processor 150 individual processors 152A-152C describe a functional module, typically implemented in software, performing a data processing function executed by a hardware element such as a hardware processor (see description related to FIG. 10).

Figure 2B:
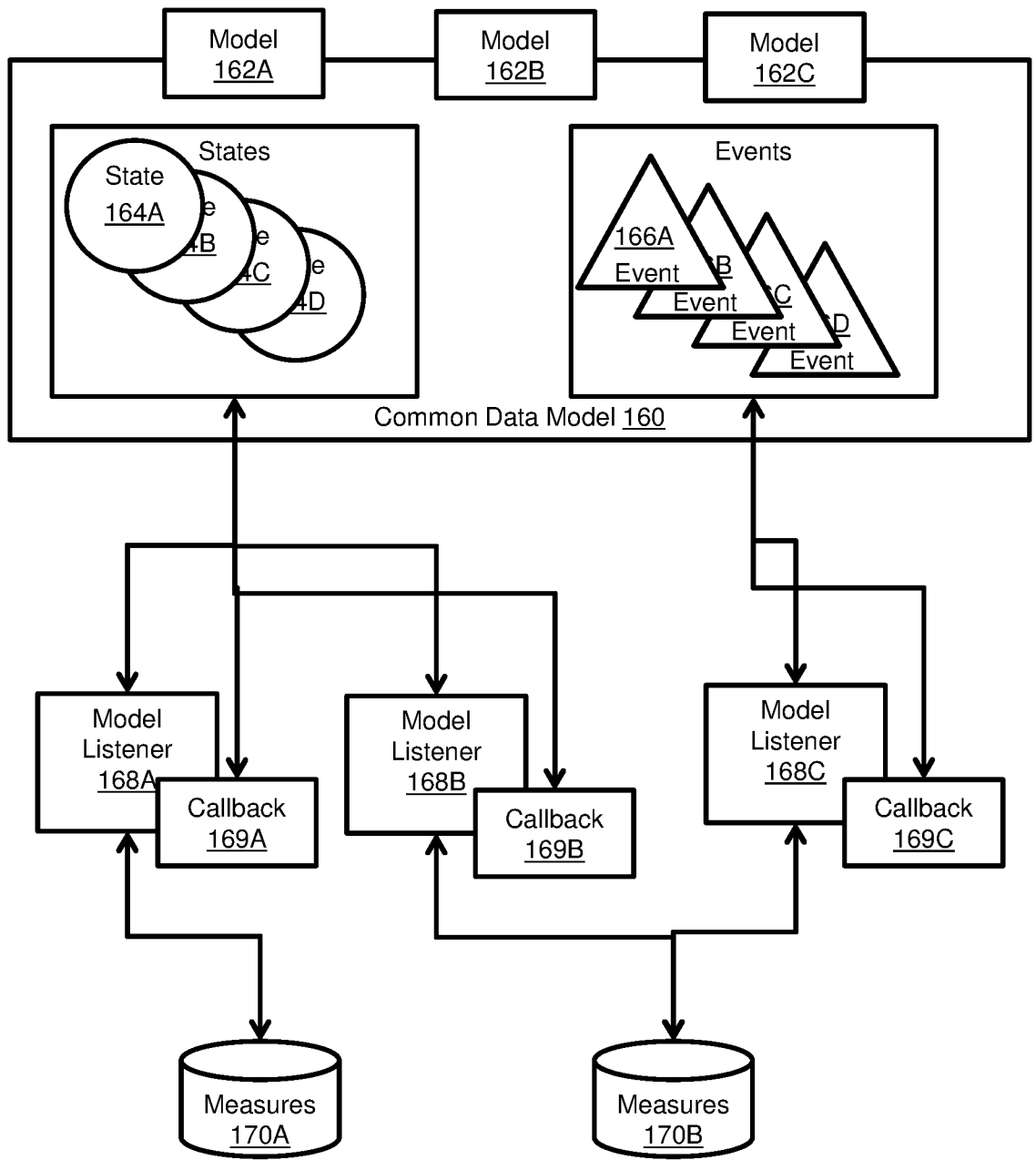
FIG. 2B shows a system diagram illustrating example details of components of the performance measurement subsystem of FIG. 1B.

FIG. 2B shows other elements of an embodiment of the performance measurement subsystem. As shown in FIG. 2B, there is one data model 162A-162C for each connector (not shown) and the data model 162A-162C acts as a gateway to the larger common data model 160. Statistics and other information on the performance data gathered from each connector (not shown) are stored in a store for the data model 162A-162C related to the connector. The stores of the data models 162A-162C are part of the larger common data model store 161. All the model listeners 168A-168C attached to components and component properties (parsed performance data) gathered by a particular connector are stored in the same data model 162A-162C. The common data model 160 encompasses the smaller data models 162A-162C and the common data model store 161 holds a collection of all the components and component properties gathered from all the connectors 140A-140F. As shown, the components comprise one or more states 164A-164D and one or more events 166A-166D. The common data model 160 provides a way to recognize and access, such as through a database lookup, individual data models 162A-162C, states 164A-164D or events 166A-166D. The common data model 160 also provides a common data framework to create new data models when they do not exist.

As shown in FIG. 2B, measures 170A-170B, including measurements and performance measurements, represent the calculation or determination of measurement values to be used in determining performance measures. The data used for the measures 170A-170B is from the common data model store 161 and is received through model listeners 168A-168C. A single measurement 170A can subscribe to a model listener 168A on the common data model 160. The act of subscribing to a model listener 168A-168C provides the measures 170A-170B with the information on the particular component and component property. Callbacks 169A-169C are functional software components that are configured to provide measure values back to the common data model 160. For illustration and not for limitation, examples of measures 170A-170B may include distances between entities in the user environment, elevations of entities compared to thresholds, stress ratings of the user and any other type of measure that may be used in a training or simulation environment.

In some embodiments, the performance measurement system may create additional performance data utilizing functions such as deadreckoning to supplement performance data from the user interfaces. Such additional data is helpful to populate the common data model store with synchronized component properties that otherwise may not have a value. For example, when the performance data represents the movement of an entity in the user environment, when that performance data is not available due to communication or other issues, deadreckoning may be used to estimate the missing movement data of the entity.

Figure 3:
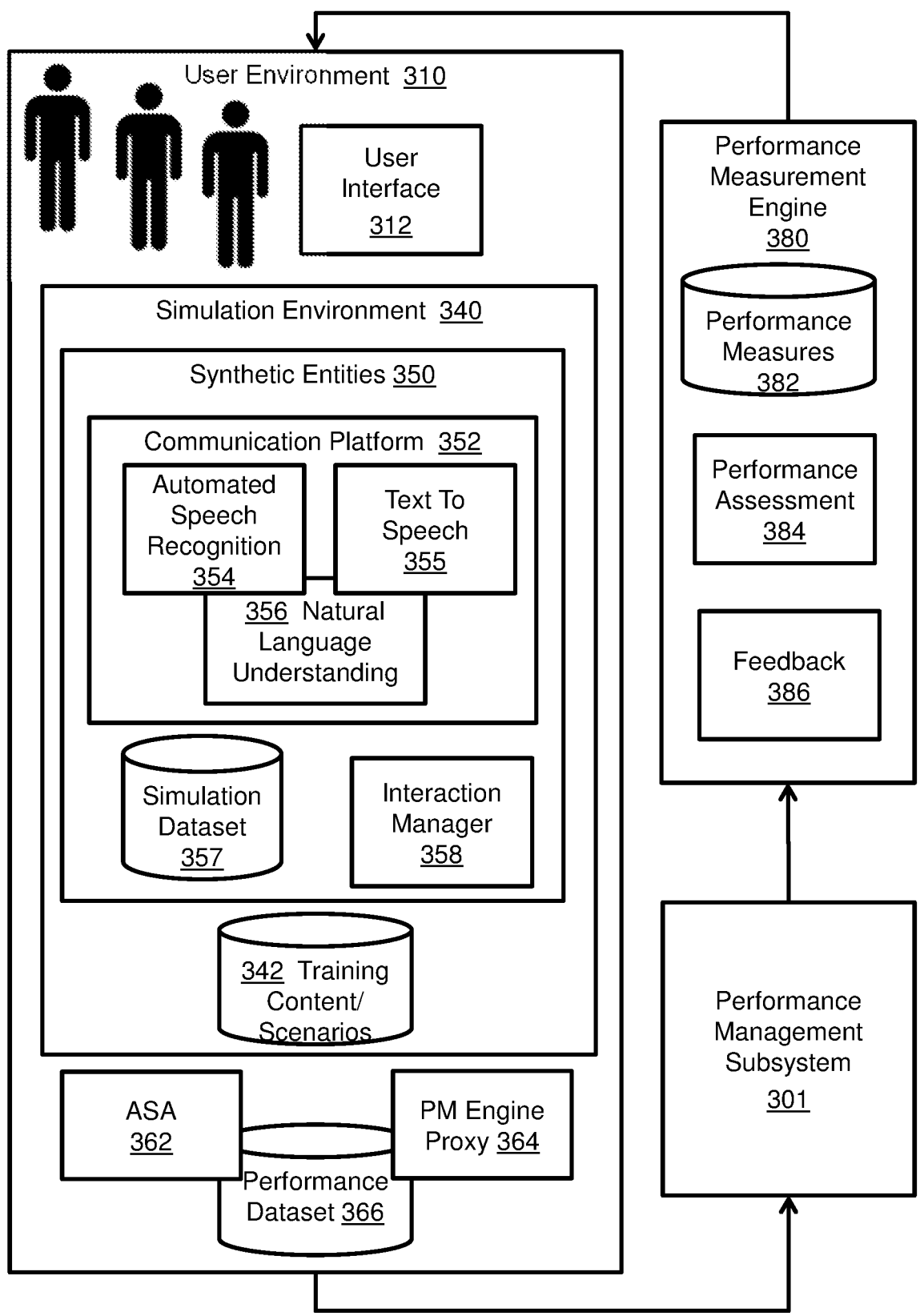
FIG. 3 shows a system diagram illustrating the high level architecture of one example embodiment of a system to measure performance integrated with a user environment having synthetic entities.

As shown in FIG. 3, some embodiments of systems to measure performance may be systems for communications training. In this example embodiment, the performance measurement system 301 communicates with a performance measurement engine 380 that includes performance measures 382. The user environment 310 in this example generally provides the interaction with the student/user through a user interface 312. The simulation environment 340 communicates with the user interface 312 and may also communicate with an server application ASA 362, a performance dataset database 382 and a performance management engine (PM Engine) proxy 364. Within the simulation environment 340, synthetic entities 350 are provided that are also in communication with a training content/scenario database 342. The synthetic entities 350 generally comprise a communication platform 352 that interacts with a simulation dataset database 357 and an interaction manager 358. The performance measurement engine 380 components include a performance measures database 382, performance assessment functions 384 and feedback functions 386. One example embodiment consistent with the user environment 310 and performance management engine 380 of FIG. 3 is detailed further in co-pending U.S. Pat. App. No. U.S. App. No. 62/296,631 filed Feb. 18, 2016 entitled "SYSTEMS AND METHODS FOR COMMUNICATIONS TRAINING" which is incorporated herein by reference in its entirety.

One Example Embodiment of Methods to Measure Performance:

The methods carried out by the performance measurement system generally comprise receiving large amounts of performance data from the user environment, recognizing the performance data type by a unique attribute and translating it into a predefined common data model so that the performance data can be monitored to most efficiently provide performance measurements of and to the user. The systems and methods increase the efficiency of updating and accessing the performance data in the common data model so that real-time or near-real time measurement may be possible.

In some embodiments consistent with the architecture of FIG. 1A, using the functional diagram of FIG. 2A, the methods to measure performance comprise passing performance data 116A through a connector 142A to a data model 162. This generally comprises the connector 142A taking the original performance data at 116A from the user environment 110 and identifying the unique key based on attributes of the performance data at 144. After the unique key is identified the performance data is broken down and parsed at 146 and then translated, or mapped, onto the common data model format of component properties and components (states and events) at 148. The component properties and components are then passed to the payload processor 150 which organizes the components and component properties (parsed performance data) and merges it with parsed components and component properties other connectors as part of the larger common data model store 161 according to the format of the common data model 160.

In some embodiments consistent with the architecture of FIG. 1B, using the functional diagram of FIG. 2B to illustrate, the methods further comprise the common data model store being monitored by model listeners 168A-168C which listen for changes in the common data model store and if a change is identified, the model listener passes information to the measures 170A-170B to determine a measurement value. The model listeners 168A-16C are each responsible to monitor specific types of components and component properties. Whenever new states or existing states change in the common data model store 161, the model listeners 168A-16C recognize that change, grab the changed data and push it to the corresponding measure 170A-170B.

Figure 4:
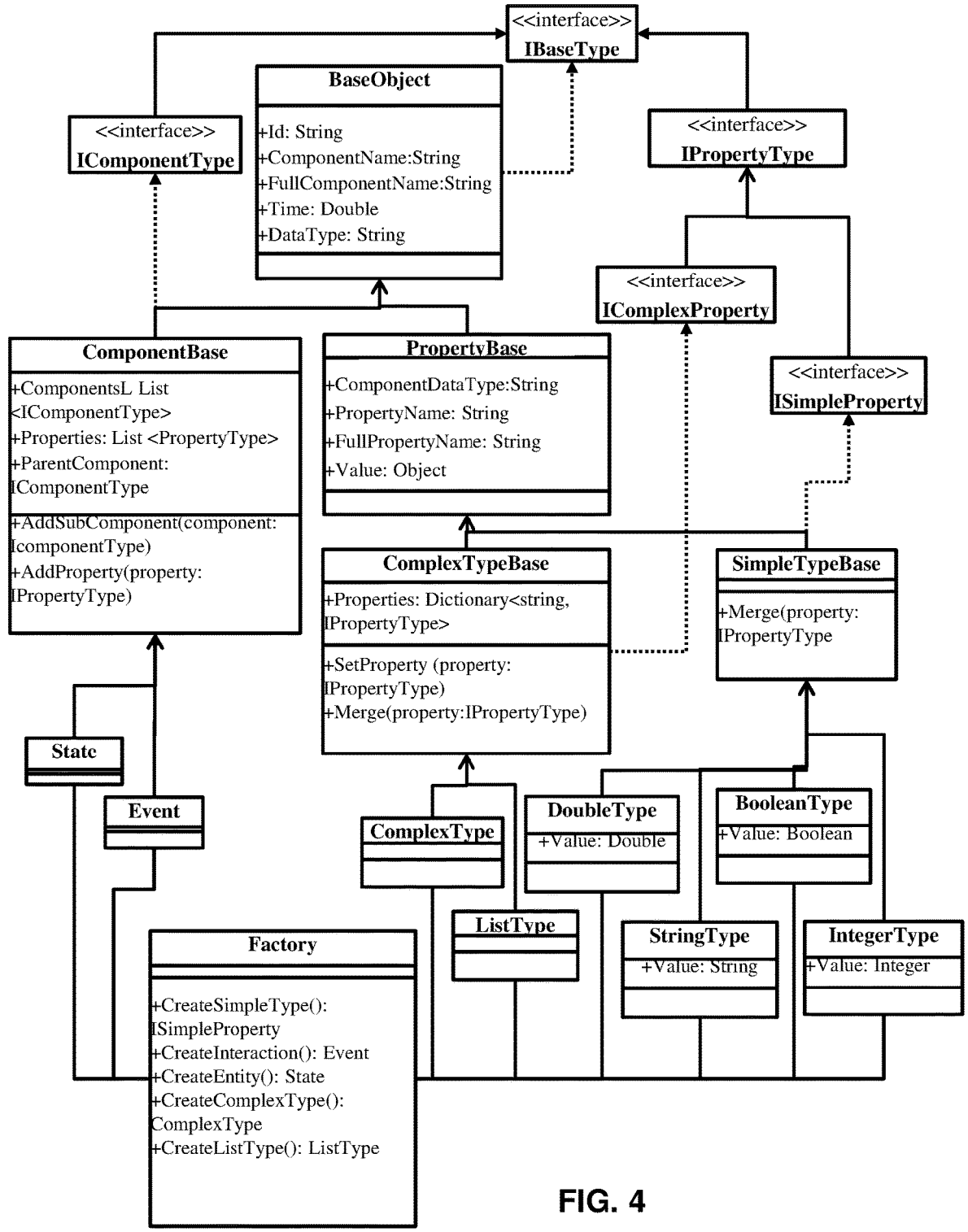
FIG. 4 shows a class diagram of the common data model.

Within the performance measurement subsystem, to efficiently address the multiple data sources, a format of a common data model is defined. FIG. 4 shows the classes that define one example embodiment of a common data model format where the different data sources conform to as a single common data model format (BaseObject) of components (ComponentBase) with component properties (PropertyBase). FIG. 4 shows a class diagram of the interfaces, abstract classes, and concrete classes, and how they relate to each other in one example embodiment. Components (ComponentBase) in the object library are the states (State) and events (Event). Components each are made up of component properties (PropertyBase) that define the component. The component properties define the information that describe the current state or the event that is happening. A complex property (ComplexTypeBase) is a component property that contains more component properties underneath it while a simple property (SimpleTypeBase) contains a simple value. The common data model includes simple property information of the following types:

Booleans (BooleanType): Yes/No, True/False, On/Off and other Boolean values.

Integers (IntegerType): Numbered values without decimal values inherently less precision.

Doubles (DoubleType): Numbered values with decimal values with max precision.

Strings (StringType): Symbols, Characters, Sentences, Words this value is a catch all for all values that cannot be broken down more and don't fit the above categories.

The classes shown in FIG. 4 are described in more detail as follows:

Base Object (BaseObject): The BaseObject is the base object that all objects from the common object library inherit from. It contains the basic component properties required by all the concrete classes in the common data model format. These include the Id which is the unique key for the data, the time the data happened at or the time the data was last updated (Time). The component data type (DataType) is stored in the name property (ComponentName) and the full name property stores the full name of the component including all the hierarchal information (FullComponentName). The data type property is set to the concrete class type: State, Event, Complex, String, Boolean, Integer, or Double.

Components (ComponentBase): Components are the high level object that all parsed performance data packets from connectors are passed as. As shown, the component is the abstract class that has all the common component properties of the component classes. A parent component is the component that is one level higher in the hierarchy chain if using a hierarchical model. The components list is the list of components that inherit from the given component class. The component properties list is the list of component properties that exist underneath the component, these component properties could be inherited from a higher level component or could be unique to the given component.

State: A state is a concrete implementation of a component. The state represents performance data that persists over time and will be updated from time to time. Connectors use states to represent entities like humans, tanks, aircraft, fishing vessels, etc. States can also represent things like a chatroom, an email terminal, a phone, or other persistent communication devices. States can also be used for more physiological type data like heart, eye, hand motions and others. What is considered a state varies from connector to connector but a common characteristic of states is that they persist beyond a single moment and their data can be updated over time.

Event: An event is a concrete implementation of a component. The event represents data that only exists for a single moment and does not update over time. After an event is used it is dropped from the common data model and its information can no longer be accessed. Examples of events include weapon fires, detonations, eye blinks, instant messages, yelling, and other types of information that happen instantaneously. Each connector makes its own distinction between events and states and parse the incoming data accordingly.

Component Properties (PropertyBase): Component properties are the information that describe components (states and events). Component properties come in two flavors complex and simple. The component property class is the generic methods and parameters that all component properties use. One basic parameter is the value parameter which returns the value of the component property. The name parameter tells the name of the component property and the component data type parameter tells the data type of the component the component property is part of.

Complex Type Base Class (ComplexTypeBase): The complex type base class is the base class for all complex concrete classes. It provides a common base of methods and parameters for all concrete classes that are of complex type. Complex type base classes are all common in that they contain a list of component properties underneath them.

Complex Type Class (ComplexType): A complex type class contains a dictionary of component properties each one is designated a name. This type of component property is commonly used for structs underneath a component having a complex description. For example, a complex type could comprise a location which is made up of two component properties latitude and longitude.

List Type Class (ListType): A complex type class is a list of component properties commonly used to list out things in a component.

Simple Type Base Class (SimpleTypeBase): The simple type base class is the base class for all simple types in the common data model. The simple type base class implements the common parameters that all simple types must use. Simple type base classes are basic value component properties that do not have component properties underneath them and have a singular value of some type. For example, a simple type could comprise the latitude, altitude, whether the landing gear is down (true or false), the content of a message or the target of a weapon fire.

Doubles (DoubleType): Doubles are precision numbers that have a decimal point, they are considered the most precise component property when it comes to numbers. If a number must be represented as a very precise value, then a double type is used.

Integers (IntegerType): Integers are numbers that have no decimal point, as such they cannot be as precise and when they are used value a naturally rounded to their whole number. Integers are used when the precise value is not needed but a number is required. For example, integers may be used to count the number of items such a mechanical parts, number of sensors, or number of eye blinks, etc.

Strings (StringType): Strings are a series of characters and symbols commonly used for describing component properties. They can also be used for a variety of different component properties like identification, callsigns, units, status messages and others. Strings are used as the default simple component property for any type of data that cannot be fitted into any of the other types.

Booleans (BooleanType): Booleans are either true or false, they represent two values at most and the value are opposite each other. They are also commonly used for on/off, yes/no, 0/1, these values often come up in Properties of either States or Events.

Factory: The Factory is used by connectors to construct the objects from the data they receive. The connector matches the external data to a particular component property with a particular name and then uses the factory to construct the object from the common object library. It passes the name of the component property or component, along with the value. If the data is going to be used as part of a simple component property then whether it is of double, integer, boolean, or string is also passed to the factory. If the factory is being used to create a state or event it also requires the unique key that it will be identified as. When a complex component property or simple component property is added to a component all the data from the component is linked to the component property so that each of the component properties that are a part of the component know the component's name and data type.

Figure 5:
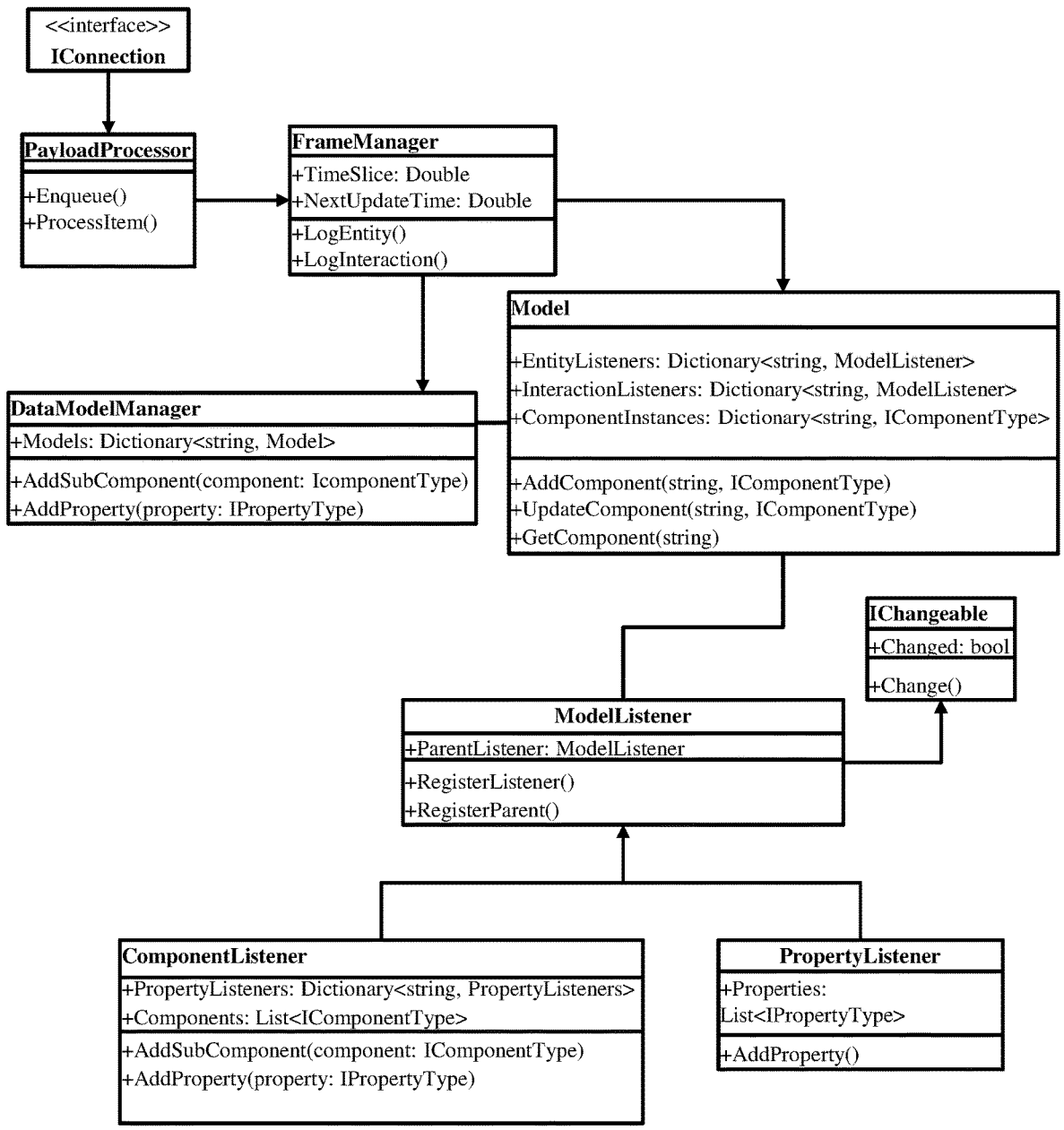
FIG. 5 shows a class diagram of the payload processors and data models and model listeners.

The next set of classes, as shown in FIG. 5, define the structure of the model listeners (ModelListeners) and the data model (Model). Model listeners are broken into two types component listeners (ComponentListeners) and property listeners (PropertyListeners). Component listeners contain property listeners and components they are monitoring. Each component listener is created to monitor a single type of either states or events and any new state or event of that type that is added to the model listener's internal monitoring list. Each property listener is created to monitor a single type of component property (IPropertyType: either ICompexProperty or ISimpleProperty, see FIG. 4) under a single type of component (IComponentType, see FIG. 4) and any new component property of that type from a new component is added to the internal monitoring list.

The classes shown in FIG. 5 are described in more detail as follows:

Model Listener (ModelListener): A model listener is the abstract class that the concrete listeners inherit from. It implements a set of methods and parameters that are used by the concrete implementations. Model listeners have a name which is either the name of the components or component properties they are monitoring. They also have a series of events that can be subscribed to for new components, component properties or when properties change. These events can be subscribed to by either measurements or other model listeners that might be higher up the hierarchy chain of a hierarchical model.

Property Listener (PropertyListener): The concrete implementation of a model listener for component properties. The property listener listens to specific component properties and will notify anyone registered to it if any of the component properties change or if new ones appear.

Component Listener (ComponentListener): The concrete implementation of a model listener for components. The same as the property listener except the component listener monitors a specific type of component.

Figure 6:
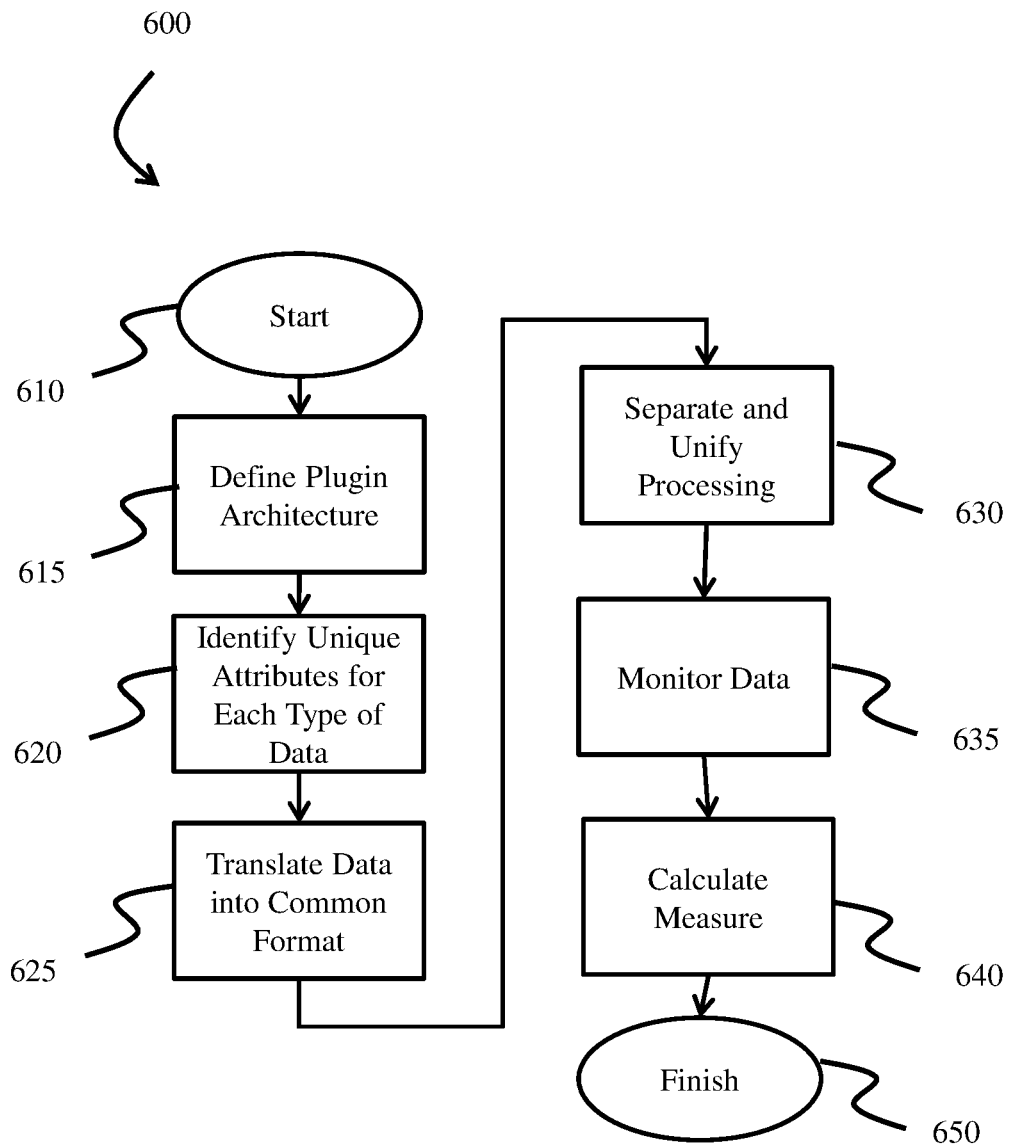
FIG. 6 shows a high level process diagram of one embodiment of the methods to measure performance.

A high level process diagram of one embodiment of the methods to measure performance is shown in FIG. 6. As shown, the steps of the process generally comprise: defining a plugin common data model architecture that can support multiple types of data at 610; identifying the unique attributes in each data type that uniquely define each type of data at 620; translating each type of performance data into a common data model format of states and events that can be recognized using the unique attributes from before to identify a unique key at 625; separating and unifying the processing of the multiple types of data into the common data model to maximize efficiency of updating the common data model store at 630; and monitoring the common data model and data model store as the multiple types of data flow into the common data model to determine down to specific component parameter when data has changed at 635 which limits the computation necessary to calculate the performance measurement or trigger calculating a measurement on specific data at 640.

Figure 7:
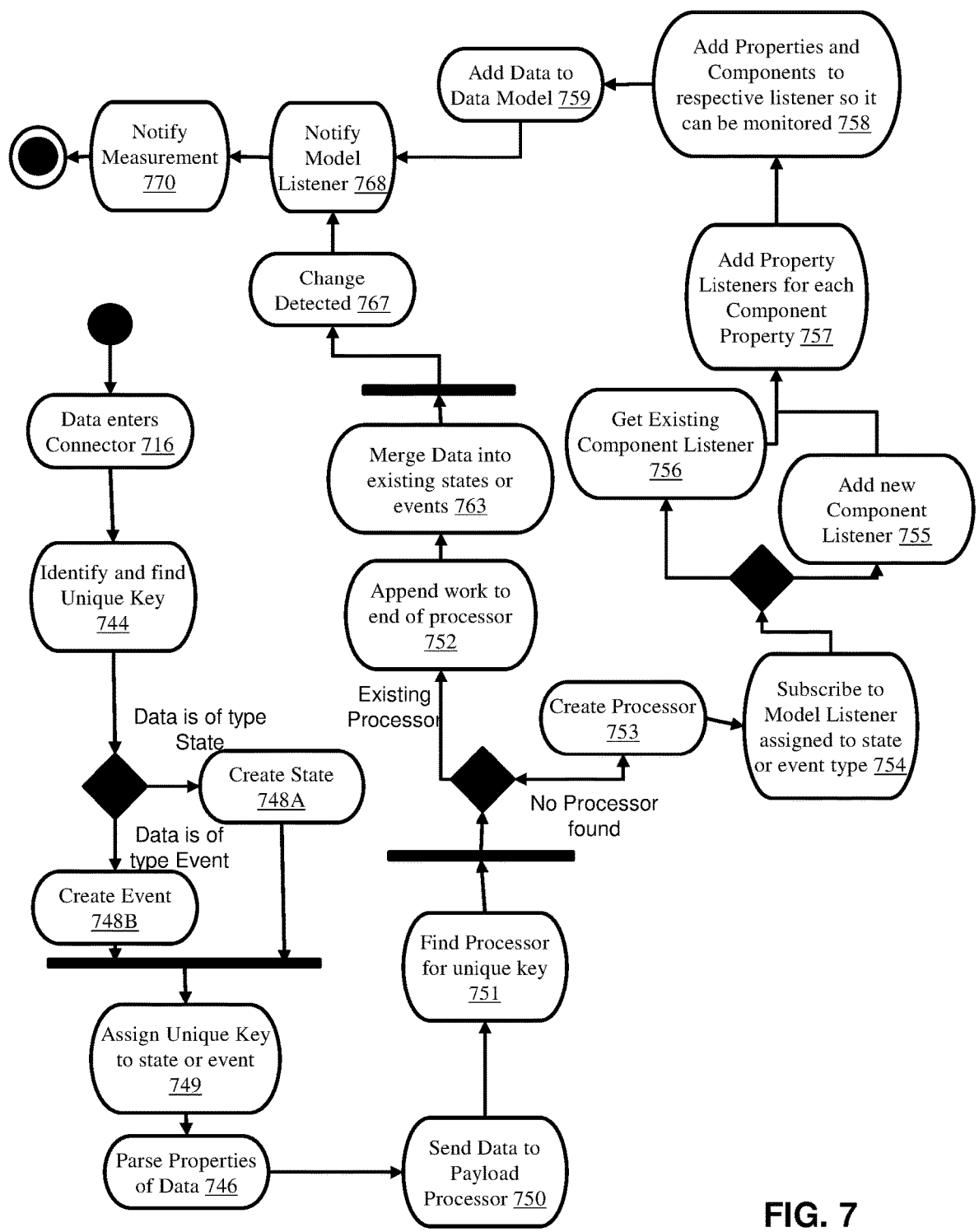
FIG. 7 shows an example activity diagram of performance data being merged into common data model from a connector.

FIG. 7 illustrates a process diagram of one example embodiment of actions from the connector to measurement. As shown, the first step raw performance data from the user environment (data source) enters a connector at 716 and the unique key is identified at 744. The connector then decides if the performance data should be mapped to a component (state or event). The component as an event at 748B or a state at 748A and the unique key is assigned as the identification at 749 for the component. The next step is to parse the data into the component properties of the component at 746. At this point the raw performance data has been translated/parsed into the format of the common data model and can be sent to the payload processor to be merged into the common data model (BaseObject) at 751. The payload processor goes through a series of steps, the first step being finding the processor that matches the identification of the component and component properties at 751. The identification should match back the unique key and each processor is related one to one with a unique key. The processors each run in parallel to each other in order to improve efficiency of adding components and component properties to the common data model. If the processor exists, the component and component properties are appended to the end of the processors work at 752. For existing processors the components are merged into their previous state at 763 and any changes or additions are detected by the attached model listener at 767 which notify the model listeners at 768 which notify the measurements of the new data at 770.

If no processor exists one is created and component data is assigned to it at 753. The component and component properties must first attach itself to a model listener and checks to see if an existing component listener of the same type as the component data is created at 756. If a component listener does not exist then it is created at 755. The next step involves checking for each of the component properties of the component to see if component property listeners exist and adding any that do not exist at 757. Once all the model listeners have been created or found the component and component properties are added to the model listeners monitoring lists so they can be monitored at 758. Once this step is complete the data is added to the data model at 759 and upon completion the model listeners are notified at 768 which notify the measurements of the new data at 770.

Figure 8:
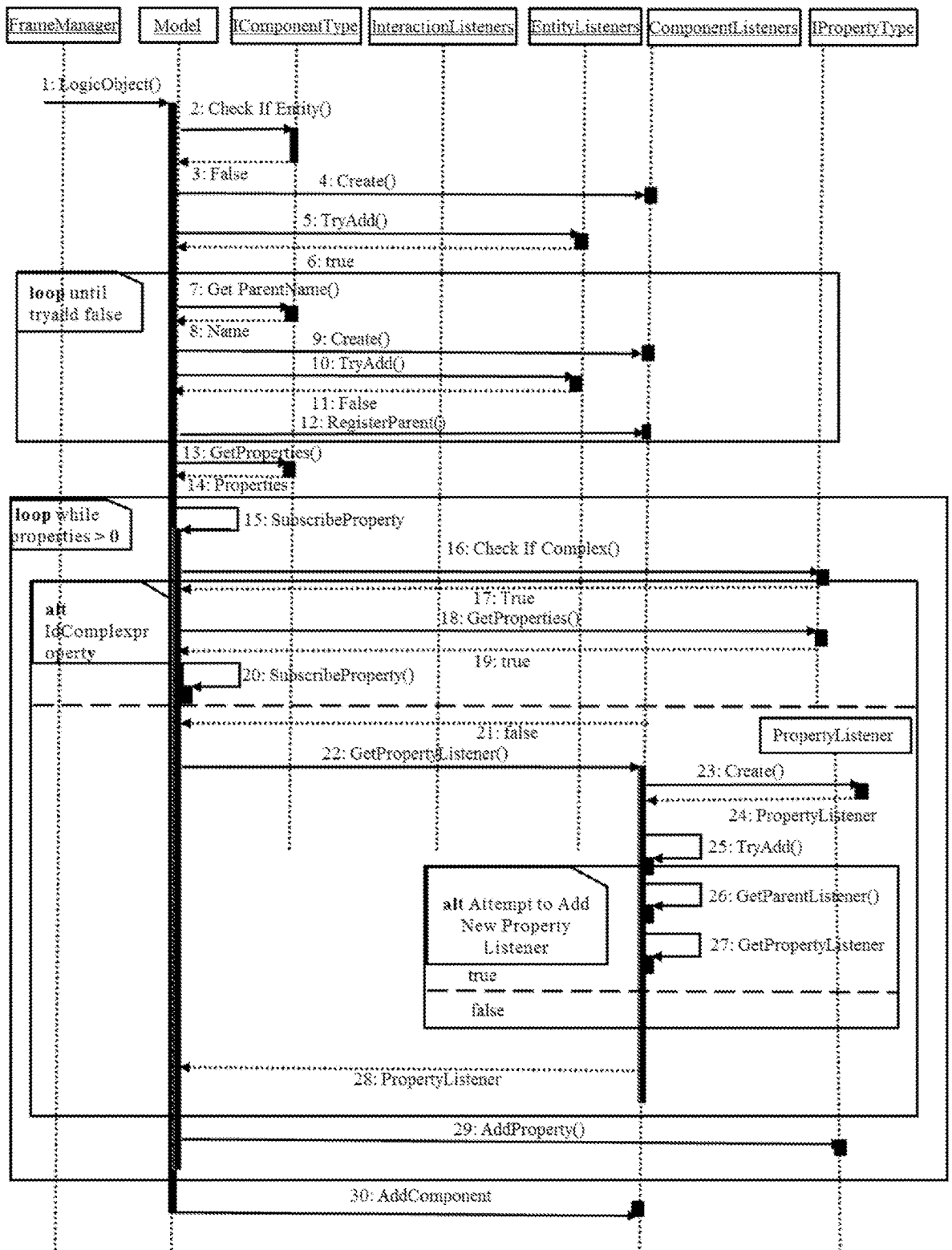
FIG. 8 shows a sequence diagram of processors creating model listeners to monitor component property data changes.

The embodiment of the methods to subscribe a component or component property to a model listener so that it may be monitored for changes is shown in FIG. 8 and generally comprises the following steps. The first step is to check if the component is a state or event (ComponentType) because there are different groups of model listeners for each type. The second step is to attempt to add or get the existing component listener (ComponentListener) that matches the component's name. The third step is to attempt to create component listeners for all the components above the current component in the hierarchy of the model. The common data model allows components to be stored in a hierarchical model where one component inherits from its parent which can also inherit from its parent and so forth. This means that model listeners must be created for each parent of the component if it is using a hierarchical model. Each type it attempts to create a parent if it is successful it will also register the model listener with the parent model listener so changes can be passed upwards between model listeners in the hierarchy. The forth step after the component listener has been created is to create the component property listeners (PropertyListeners). In order to create the component property listener, the component listener from the previous step is used since each component property listener monitor component properties under the scope of a single component type/component listener. The steps to creating a component property listener start with attempting to add a new component property listener to the component listener if one already exists that one is returned. If no component property listener exists than the component property listener is added to the list of component property listeners on the component listener. Then it is checked to see if the component listener has a parent component listener if it does then it repeats the process of creating a component property listener on the parent component listener. This step is important in for hierarchical models in which component properties may be inherited from parent component listener. When this is complete the newly created component property listener is returned and the step is complete. In the fifth step the components and component properties are added to the component listener and component property listener that were created in the previous steps. The model listeners will subscribe to the change event of the new component properties and components and anytime that component property changes the event will be triggered and the model listener will be notified. Also, since the component property or component is being added to the model listeners it can notify measures that a new component property or component has appeared that it is interested in.

Figure 9:
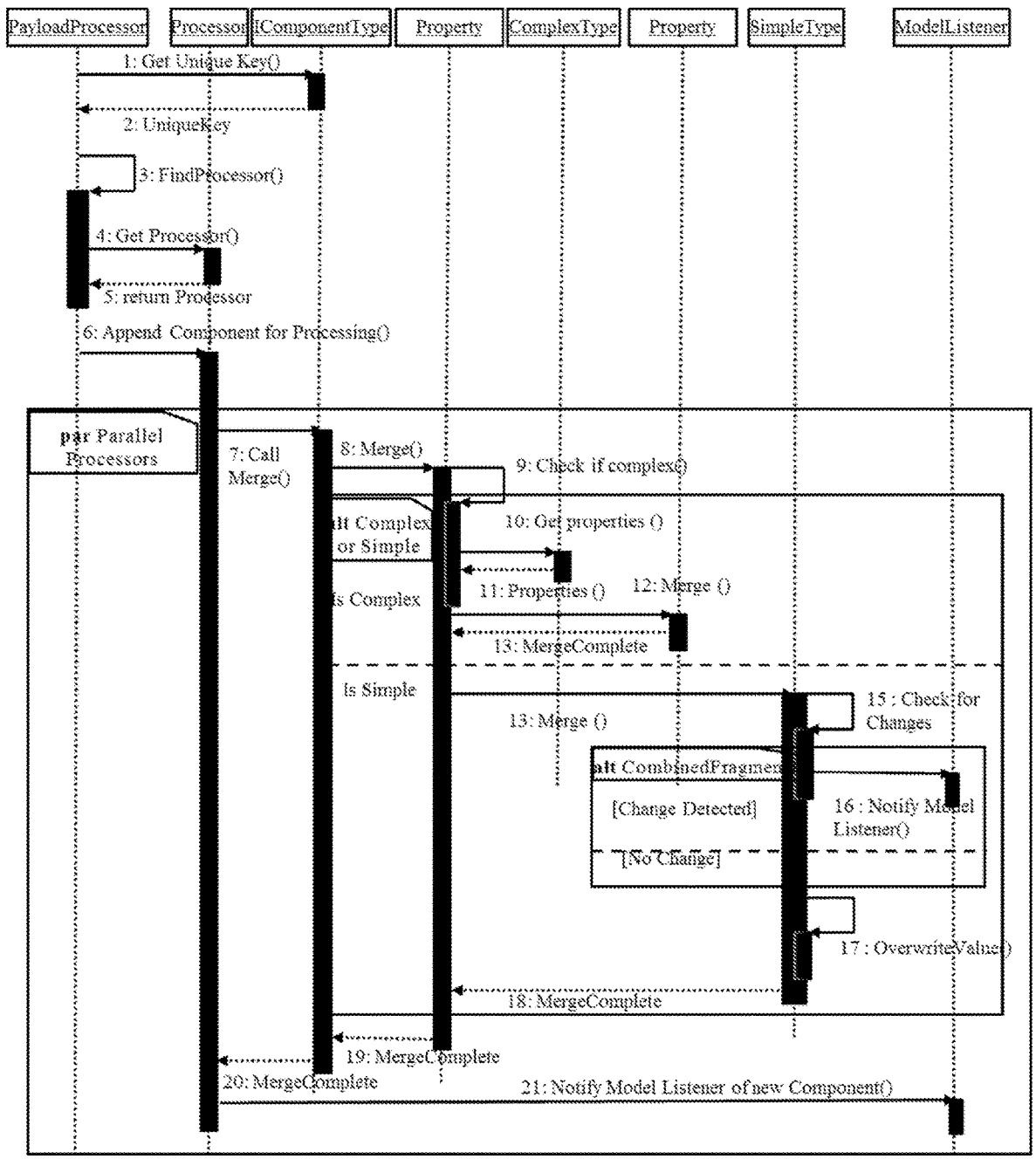
FIG. 9 shows a sequence diagram of component property data being merged and changes being checked.

The process of data merging components and component properties describes the process where one state is merged into another state for the purposes of updating the information and checking for changes. One example of data merging is shown in FIG. 9. If a processor already exists for a given unique key as described in FIG. 7, it will attempt to merge its data into the already running processor. States in the common data model are persistent data that represent objects like humans, vehicles, and chat rooms that persist beyond a single moment like events. This type of data must be updated periodically and when it does some or none of the previous information may change. If none the information changes then any measurement done on the object does not need to be done again. This preserves valuable calculation time required in other operations like the fusion of different data sources and parsing of raw data into the common object library that happens in the connectors. In FIG. 9 the first step to merging data is calling merge on the existing component and passing the new component. The second step is to update the time attribute and loop through all the component property (Property) of the new component and if it does not exist in the current component it is added. If the component property does exist that the merge method is called on the existing component property and the component property from the new component is passed to it. The third step is to check the new component property to see if it is a complex component property (ComplexType). A complex component property is made of more component properties underneath it and each component property must be checked against the current component property children component properties much like the previous step. New children component properties are added and existing component properties are merged. The third step is when a simple component property has to be merged when doing this a couple of things must happen. The first is that the value must be checked between the new and current if they are the same then no event is triggered. If the value has changed then a component property changed event (PropertyChanged Event) is triggered and the parent component property and component are notified. Also, any component property listeners monitoring the component property are notified as well that the component property has changed. The value is then updated and the merging is complete for this component property. When all component properties of a component are merged or added the component has completed merging and the merging process is complete. At this time the processor can complete or move on to the next component data that needs to be merged.

One Example Embodiment of a Performance Measurement Subsystem:

As will be readily apparent to those skilled in the art, the performance management subsystems and methods to measure performance can be embodied in hardware, software, or a combination of hardware and software. For example, a computer system or server system, or other computer implemented apparatus combining hardware and software adapted for carrying out the methods described herein, may be suitable. One embodiment of a combination of hardware and software could be a general purpose computer system with a computer program that, when loaded and executed, carries out the respective methods described herein. In some embodiments, a specific use computer, containing specialized hardware and software for carrying out one or more of the instructions of the computer program, may be utilized. In some embodiments, the computer system may comprise a device such as, but not limited to a digital phone, cellular phone, laptop computer, desktop computer, digital assistant, server or server/client system.

Computer program, software program, program, software or program code in the present context mean any expression, in any language, code or notation, of a set of instructions readable by a processor or computer system, intended to cause a system having an information processing capability to perform a particular function or bring about a certain result either directly or after either or both of the following: (a) conversion to another language, code or notation; and (b) reproduction in a different material form. A computer program can be written in any form of programming language, including compiled or interpreted languages, and it can be deployed in any form, including as a stand-alone program or as a module, Component, subroutine, or other unit suitable for use in a computing environment. In some embodiments, the performance measurement subsystem is implemented in software and is based on the .Net Framework and CSharp programming language.

FIG. 10 is a schematic diagram of one embodiment of a computer system 1000 by which the methods may be carried out. The computer system 1000 can be used for the operations described in association with any of the computer implemented methods described herein. The computer system 1000 includes at least one processor 1010, a memory 1020 and an input/output device 1040. Each of the components 1010, 1020, and 1040 are operably coupled or interconnected using a system bus 1050. The computer system 1000 may further comprise a storage device 1030 operably coupled or interconnected with the system bus 1050.

The processor 1010 is capable of receiving the instructions and/or data and processing the instructions of a computer program for execution within the computer system 1000. In some embodiments, the processor 1010 is a single-threaded processor. In some embodiments, the processor 1010 is a multi-threaded processor. The processor 1010 is capable of processing instructions of a computer stored in the memory 1020 or on the storage device 1030 to communicate information to the input/output device 1040. Suitable processors for the execution of the computer program instruction include, by way of example, both general and special purpose microprocessors, and a sole processor or one of multiple processors of any kind of computer.

The memory 1020 stores information within the computer system 1000. Memory 1020 may comprise a magnetic disk such as an internal hard disk or removable disk; a magneto-optical disk; an optical disk; or a semiconductor memory device such as PROM, EPROM, EEPROM or a flash memory device. In some embodiments, the memory 1020 comprises a transitory or non-transitory computer readable medium. In some embodiments, the memory 1020 is a volatile memory unit. In another embodiment, the memory 1020 is a non-volatile memory unit.

The processor 1010 and the memory 1020 can be supplemented by, or incorporated in, ASICs (application-specific integrated circuits).

The storage device 1030 may be capable of providing mass storage for the system 1000. In various embodiments, the storage device 1030 may be, for example only and not for limitation, a computer readable medium such as a floppy disk, a hard disk, an optical disk, a tape device, CD-ROM and DVD-ROM disks, alone or with a device to read the computer readable medium, or any other means known to the skilled artisan for providing the computer program to the computer system for execution thereby. In some embodiments, the storage device 1030 comprises a transitory or non-transitory computer readable medium.

In some embodiments, the memory 1020 and/or the storage device 1030 may be located on a remote system such as a server system, coupled to the processor 1010 via a network interface, such as an Ethernet interface.

The input/output device 1040 provides input/output operations for the system 1000 and may be in communication with a user interface 1040A as shown. In one embodiment, the input/output device 1040 includes a keyboard and/or pointing device. In some embodiments, the input/output device 1040 includes a display unit for displaying graphical user interfaces or the input/output device 1040 may comprise a touchscreen. In some embodiments, the user interface 1040A comprises devices such as, but not limited to a keyboard, pointing device, display device or a touchscreen that provides a user with the ability to communicate with the input/output device 1040.

The computer system 1000 can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, wireless phone networks and the computers and networks forming the Internet.

One example embodiment of a computer or processor based system to measure performance is shown in FIG. 3. As shown, the user environment 310 comprises the environment that the students may be using for their training. The environment may comprise one or more students interacting with a computer based simulator as the simulation environment 340. The students may interface with the computer based simulator utilizing multiple methods. The student may interface with the simulator directly utilizing a user interface of the simulator, through a user interface device communicating directly to the simulator or through a user interface device over a network to all or portions of the simulator. The students may interface independently or them may interface simultaneously and they may interface in a distributed training environment over a distributed data network. The simulation environment 340 may allow the user to interface with the user interface 312, a synthetic entity module 350, a performance dataset database 366A and/or a training content database 342A. Within the simulation environment 340, a selected training content/scenario from the training content database 342A is used by the interaction manager module 358 to dictate the scenarios presented to the user though the user interface. The scenarios include communications from the simulation dataset 357 as well as any other required configurations for the user interface. The training content/scenarios are communicated to the user through the user interface and may include communications defined by the simulation dataset 357 from the communication platform modules 352. The communications from the student to the user interface is communicated to and received by the synthetic entity 350 though the communication platform modules 352. Within the functions of the synthetic entity 350, the communication platform modules 352 transform the verbal communication to text and communicate the text to the interaction manager module 358. The interaction manager module 358 attempts to match the text received to entries in the simulation dataset 357. This match is used to identify the communication received and compare that to the communication expected for the training content/scenario selected. The communication received may also be stored in a performance dataset database 366A to be used to compare the communication received to performance measurement data. A measure of that communication from the performance management subsystem 301 may also be communicated to the performance measurement engine server 380 for comparison to a performance measures database 382 to measure the performance of that communication against predefined performance measures. Components of the above system may be co-located or they may be distributed over a communication network. For example, as shown, the training content database 342B and/or performance dataset database 366B may not be in the computer based simulator 340 but may be in communication with the simulator 340 over a data network.

One example embodiment of the systems and methods to measure performance may be embodied in a computer program product, the computer program product comprising a computer readable medium having a computer readable program code tangibly embodied therewith, the computer program code configured to implement the methods described herein, and which, when loaded in a computer system comprising a processor, is able to carry out these methods.

We claim:

1. A computer based method to determine a measure of a team performance, the method comprising:
    providing a user environment configured to communicate a training content to a team;
    receiving a plurality of performance data inputs from at least one user interface of the user environment;
    translating the plurality of performance data inputs into a plurality of components according to a common data model format;
    the plurality of components comprising a plurality of component properties defining a plurality of states of a plurality of users and a plurality of events;
    separating the plurality of components for processing by one or more payload processors;
    processing the plurality of components by the one or more payload processors;
    after the processing by one or more payload processors, merging the plurality of components with a synchronized time value as a complex component;
    storing the complex component into a common data model store according to the common data model format;
    the complex component represents a state of the team;
    the team comprising of the plurality of users;
    determining a performance measure value for one of the plurality of events; and
    communicating the performance measure value as the measure of the team performance.

2. The computer based method of claim 1 wherein the user environment is a training simulator.

3. The computer based method of claim 1 wherein the performance measure value comprises one of the plurality of states of the team given one of the plurality of events at the synchronized time value.

4. The computer based method of claim 1 wherein the step of determining a performance measure value for one of the plurality of events comprises:
    monitoring merging the plurality of components with a synchronized time value into the common data model store;
    monitoring the component in the common data model store;
    identifying a change to the complex component or a complex component property of the complex component;
    communicating the change to a performance measurement subsystem to calculate a performance measure value; and
    communicating the performance measure value wherein the performance measure value comprises one of the plurality of states of the team.

5. The computer based method of claim 1 wherein one of the plurality of component properties defining a user state of one of the plurality of users.

6. The computer based method of claim 1 wherein:
one of the plurality of component properties defining a user state of one of the plurality of users; and
the plurality of users defining the team.

7. The computer based method of claim 1 wherein the at least one user interface comprises a physiological interface.

8. The computer based method of claim 1 wherein the at least one user interface comprises one or more electrocardiogram (ECG) electrodes for recording electrical impulses as the performance data inputs.

9. A computer based performance measurement system to determine a performance measure of a team, the system comprising:
  a user environment configured to communicate a training content to a team;
  the user environment configured to receive a plurality of performance data inputs from at least one user interface;
  the user environment configured to translate the plurality of performance data inputs into a plurality of components according to a common data model format;
  a performance measurement subsystem comprising at least one connector, at least one payload processor, at least one processor, at least one common data model store;
  the at least one connector configured to:
    transform each of the plurality of performance data inputs into at least one component property of at least one component according to a format of a common data model,
    identify a unique key for each of the at least one component, and
    communicate the at least one component with the unique key;
  the at least one payload processor configured to:
    receive the at least one component and the unique key and merge the component with a synchronized time value as a complex component, and
    store the complex component into a common data model store according to the common data model format; and
  the at least one processor configured to:
    determine a performance measure value for the complex component, and
    communicate the performance measure value as the performance measure of a team.

10. The computer based performance measurement system of claim 9 wherein the user environment comprises a multi-modal training simulator.

11. The computer based performance measurement system of claim 9 wherein the at least one payload processor is further configured to merge the performance measure value with an existing complex component in the common data model store.

12. The computer based performance measurement system of claim 11 wherein the performance measure value is be used as a complex component property to calculate another measure value.

13. The computer based performance measurement system of claim 9 wherein the at least one user interface further comprises a physiological interface.

14. The computer based performance measurement system of claim 13 wherein the physiological interface comprises one or more electrocardiogram (ECG) electrodes for recording electrical impulses as the performance data inputs.

* * * * *